US007682099B2

(12) United States Patent
Cole

(10) Patent No.: US 7,682,099 B2
(45) Date of Patent: Mar. 23, 2010

(54) INDEXABLE, LOCKABLE PIVOTING MECHANISM FOR HAND TOOL

(76) Inventor: Charles A. Cole, 3621 Trailview Dr., Plano, TX (US) 75074

( * ) Notice: Subject to any disclaimer, the term of this patent is extended or adjusted under 35 U.S.C. 154(b) by 722 days.

(21) Appl. No.: 11/356,601

(22) Filed: Feb. 17, 2006

(65) Prior Publication Data

US 2007/0169590 A1 Jul. 26, 2007

Related U.S. Application Data

(60) Provisional application No. 60/761,514, filed on Jan. 24, 2006.

(51) Int. Cl.
*B25G 3/38* (2006.01)
*F16C 11/10* (2006.01)

(52) U.S. Cl. ......................... 403/97; 81/58.3; 81/177.8; 254/129; 192/69.91

(58) Field of Classification Search ..................... 81/58, 81/58.3, 58.4, 177.7, 177.8, 177.9; 192/69, 192/69.91; 403/97
See application file for complete search history.

(56) References Cited

U.S. PATENT DOCUMENTS

| | | | | |
|---|---|---|---|---|
| 2,921,773 | A * | 1/1960 | Hoelzer | 254/129 |
| 3,039,339 | A | 6/1962 | Hanson | |
| 3,376,768 | A | 4/1968 | Fortunato | |
| 4,901,608 | A * | 2/1990 | Shieh | 81/177.8 |
| 4,929,113 | A * | 5/1990 | Sheu | 403/157 |
| 5,581,838 | A * | 12/1996 | Rocco | 15/110 |
| 5,860,337 | A | 1/1999 | Janssen | |
| 6,240,809 | B1 * | 6/2001 | Sasarak | 81/60 |
| 6,324,947 | B2 | 12/2001 | Jarvis | |
| 6,412,374 | B1 | 7/2002 | Hsieh | |
| 6,840,141 | B2 * | 1/2005 | Cole | 81/177.8 |
| 7,082,862 | B2 * | 8/2006 | Lee | 81/177.8 |
| 7,168,346 | B2 * | 1/2007 | Lin | 81/177.9 |
| 7,237,463 | B1 * | 7/2007 | Lee | 81/177.8 |
| 2004/0134314 | A1 * | 7/2004 | Cole | 81/177.8 |
| 2004/0226418 | A1 | 11/2004 | Honnibal | |
| 2005/0097994 | A1 * | 5/2005 | Liao | 81/58.3 |
| 2005/0178249 | A1 * | 8/2005 | Cole | 81/177.8 |

* cited by examiner

*Primary Examiner*—Richard M. Lorence

(57) ABSTRACT

A indexable, lockable mechanism for a hand tool, and hand tools with such mechanism, the mechanism comprising a first member having a first splined orifice, a second member having an upper prong with a second splined orifice and a lower prong with a third splined orifice, and a splined pin assembly for insertion through said first, second and third orifices. The first member is positioned in a gap between the upper prong and the lower prong of the second member with the first splined orifice coaxially aligned with the second and third splined orifices of the second member. The splined pin assembly of either the first embodiment or the second embodiment is disposed in the three splined orifices and is axially movable between an unlocked position and a locked position. The splined pin assembly is allows a user to move the splined pin axially in the first and second orifices between the locked position and the unlocked position.

12 Claims, 5 Drawing Sheets

INDEXABLE, LOCKABLE PIVOTING MECHANISM FOR HAND TOOL

CROSS REFERENCE TO RELATED APPLICATIONS

This application claims the benefit of U.S. Provisional Application No. 60/761,514 filed on Jan. 24, 2006, entitled "Hand Tool with Indexable, Lockable Mechanism."

TECHNICAL FIELD

The present invention relates to mechanisms for hand tools and particularly to mechanisms for hand tools having members coupled together, such mechanisms being adapted to provide movement relative to each other. More particularly, the invention relates to an indexable, lockable mechanism adapted to permit two members of a hand tool to pivot relative to each other.

BACKGROUND OF THE INVENTION

Mechanisms used to couple hand tool members such as a head and a handle together are well known. Many of these mechanisms allow members to be coupled and adjusted to a desired position. However, existing devices suffer from many disadvantages. Many of these coupling devices are complex and comprised of many parts. What is desired is a mechanism that is adapted to couple two members together, allows the coupler to be easily engaged and disengaged, and is efficiently made from a minimum number of moving parts.

SUMMARY OF THE INVENTION

The present invention comprises a first member having a first splined orifice, a second member having an upper prong with a second splined orifice and a lower prong with a third splined orifice, and a splined pin assembly for insertion through said first, second and third orifices. The first member includes there-through the first splined orifice and is positioned between the upper prong and the lower prong of the second member with the first splined orifice coaxially aligned with the second and third splined orifices of the second member.

A first embodiment of the present invention has a splined pin assembly comprising a splined pin with a square cut around a circumference of the pin, a predetermined length L from the end of the pin and a smooth, central longitudinal bore there-through, a first retaining cap being a circular planar member having a plurality of square shoulders of varying radii and a central, bored, threaded cylindrical extension extending from and orthogonal to the inner face of the first retaining cap, a flat spring, a second retaining cap being a circular planar member having a smooth, central, tapered bore there-through and a screw with a tapered head to be disposed through the central bore of the second retaining cap to be coupled to the bored, threaded cylindrical extension extending from and orthogonal to the inner face of the first retaining cap.

The flat spring of the first embodiment of the splined pin assembly is adapted to resist force after the splined pin assembly has been depressed downwardly to move the pin assembly into the unlocked position. The upward position is the locked position of the splined pin. Downward force is applied to the splined pin assembly to position the splined pin assembly in the unlocked, indexable position.

A second embodiment of the present invention has a splined pin assembly comprising a splined pin with a first, square cut around a circumference of the splined pin commencing at the edge of the splined pin, a second v-groove cut around a circumference of the splined pin and longitudinally located between the middle and ⅓ to the edge of the splined pin, and a third square cut around the circumference of the pin near the edge of the pin opposite the first square cut. The splined pin has a bore there-through and is threaded at both ends of the bore. The splined pin assembly further comprises a first retaining cap being a circular planar member having a centered, smooth tapered bore there-though, a first screw with a tapered head to be disposed through the first retaining cap to couple the first retaining cap, via the first screw, with one end of the threaded bore of the splined pin; a circular wire to be disposed around the splined pin about the v-groove; a second retaining cap being a circular planar member having a centered, smooth tapered bore there-though; and a second screw with a tapered head to be disposed through the second retaining cap to couple the second retaining cap via the second screw with the other threaded bore of the splined pin.

The circular wire of the second embodiment of the splined pin assembly is adapted to sit within the v groove channel of the splined pin in the locked position and is adapted to be forced by a portion of the upper prong of the second member from the v-groove onto a portion of the splined pin in the unlocked position when downward force is applied to the outer face of the retaining cap of the splined pin assembly by the user.

In one embodiment of the present invention, the first member comprises a tool handle or extension and second member comprises a tool head. In another embodiment of the present invention, there are two splined pin assemblies, one located at the first end of a hand tool extension and the second located at the opposite end of the hand tool extension. Alternatively, the first member and second member can comprise the opposite ends of a hand tool extension. However, as would be obvious to one skilled in the art, the first member can be interchanged with the second member and vice versa. The present invention is intended to cover all such variations and configurations. The present invention further includes the aforementioned first member and second member in combination with a variety of tool heads, such as pry bar heads, ratchet head, ratcheting box wrench heads, open wrench heads and closed wrench heads.

The splined pin assembly of either the first embodiment or the second embodiment is disposed in the three splined orifices and is axially movable between an unlocked position and a locked position. The splined pin assembly is allows a user to move the splined pin axially in the first and second orifices between the locked position and the unlocked position. The splines of the splined pin are disposed in the first, and different portions of the second and third orifices in the locked position and the unlocked position.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
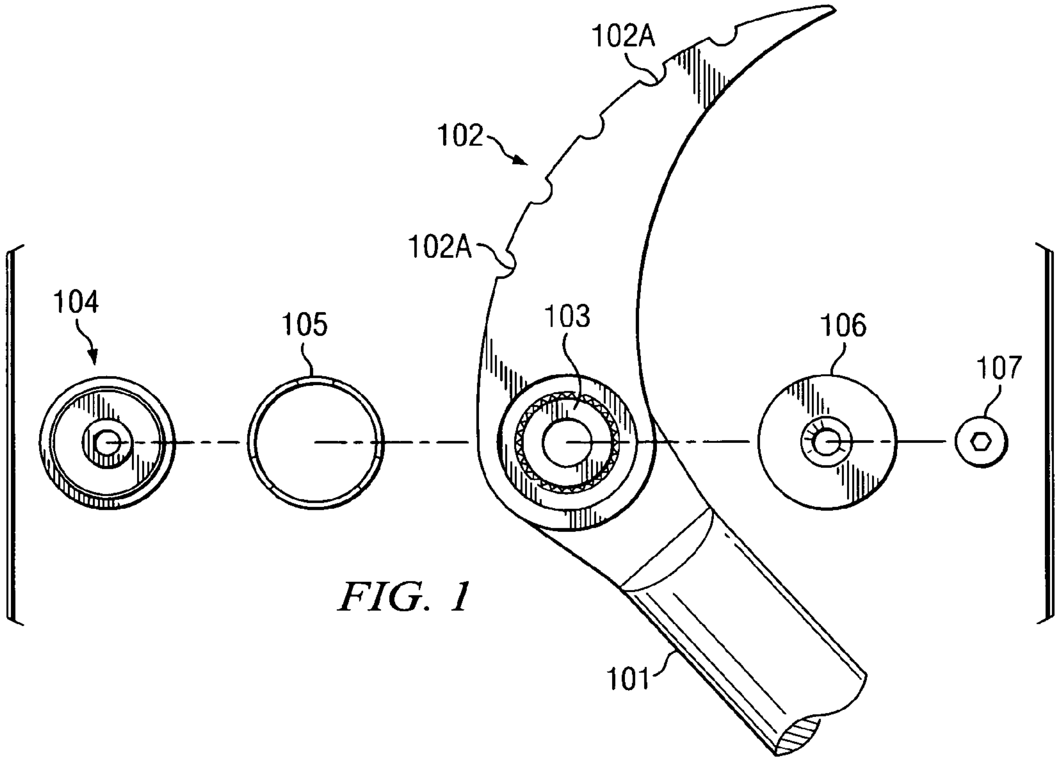
FIG. 1 is a top view of an indexable pry bar having a coupler in the first embodiment of the present invention in a partially disassembled state.

Referring to FIG. 1, a top view of an indexable pry bar having a coupler in the first embodiment of the present invention in a partially disassembled state is seen. First member 101 is a handle for the hand tool having a first splined orifice and second member 102 is a pry bar head that has a second and third splined orifice. The coupler is a splined pin assembly adapted for insertion through said first, second and third orifices. A first embodiment of the splined pin assembly includes a splined pin 103, a first retaining cap 104, a flat spring 105, a second retaining cap 106 and a screw 107.

Figure 2:
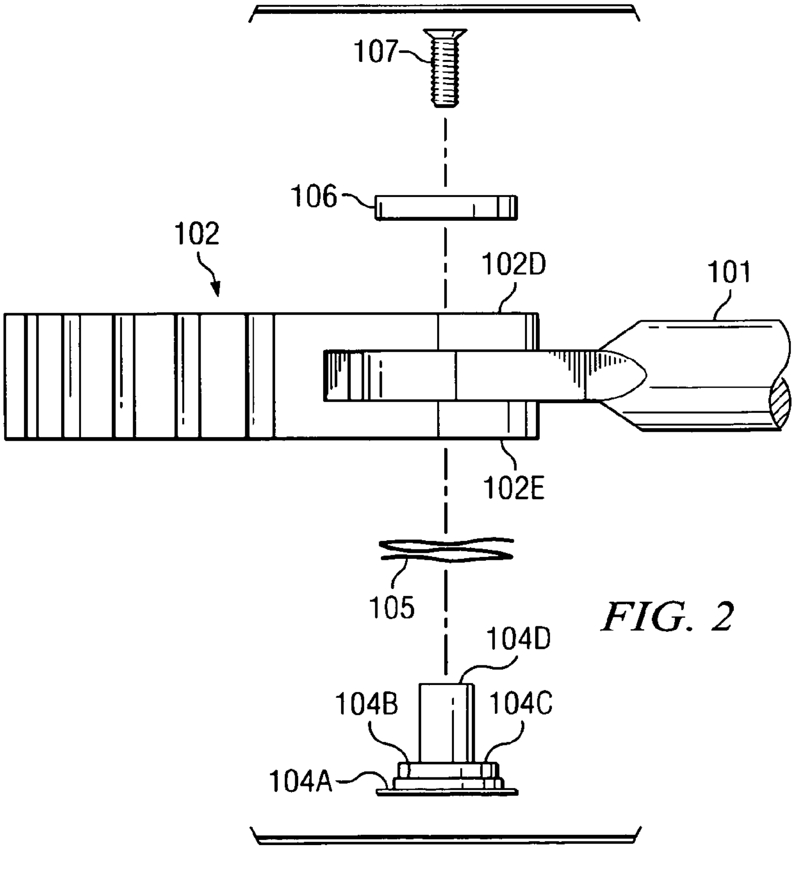
FIG. 2 is a side elevational view of a second side of the indexable pry bar of FIG. 1.

FIG. 2 is a side elevational view of a second side of the indexable pry bar of FIG. 1. As seen therein, the first member 101 is positioned between an upper prong 102D and a lower prong 102E of second member 102. Second member 102 comprises a pry bar head having notched along the upper face thereof a plurality of notches 102A for providing a better grip between the materials being pried apart. In other embodiments of the present invention, second member 102 can comprise other tool heads such as a ratchet head, ratcheting box wrench head, open wrench head, closed wrench head and the like. Also seen in FIG. 2 is splined pin assembly is adapted for insertion through said first, second and third orifices. The first embodiment of the splined pin assembly includes a first retaining cap 104, a flat spring 105, a second retaining cap 106 and a screw 107. First retaining cap 104 comprises a circular planar member having a first square shoulder 104A having a first radius, a second square shoulder 104B having a second, smaller radius than the first radius, a third square shoulder having a third radius smaller than the second radius and having a centered, bored, threaded cylindrical extension 104D extending from, and orthogonal to, the inner face of the first retaining cap 104.

Figure 3:
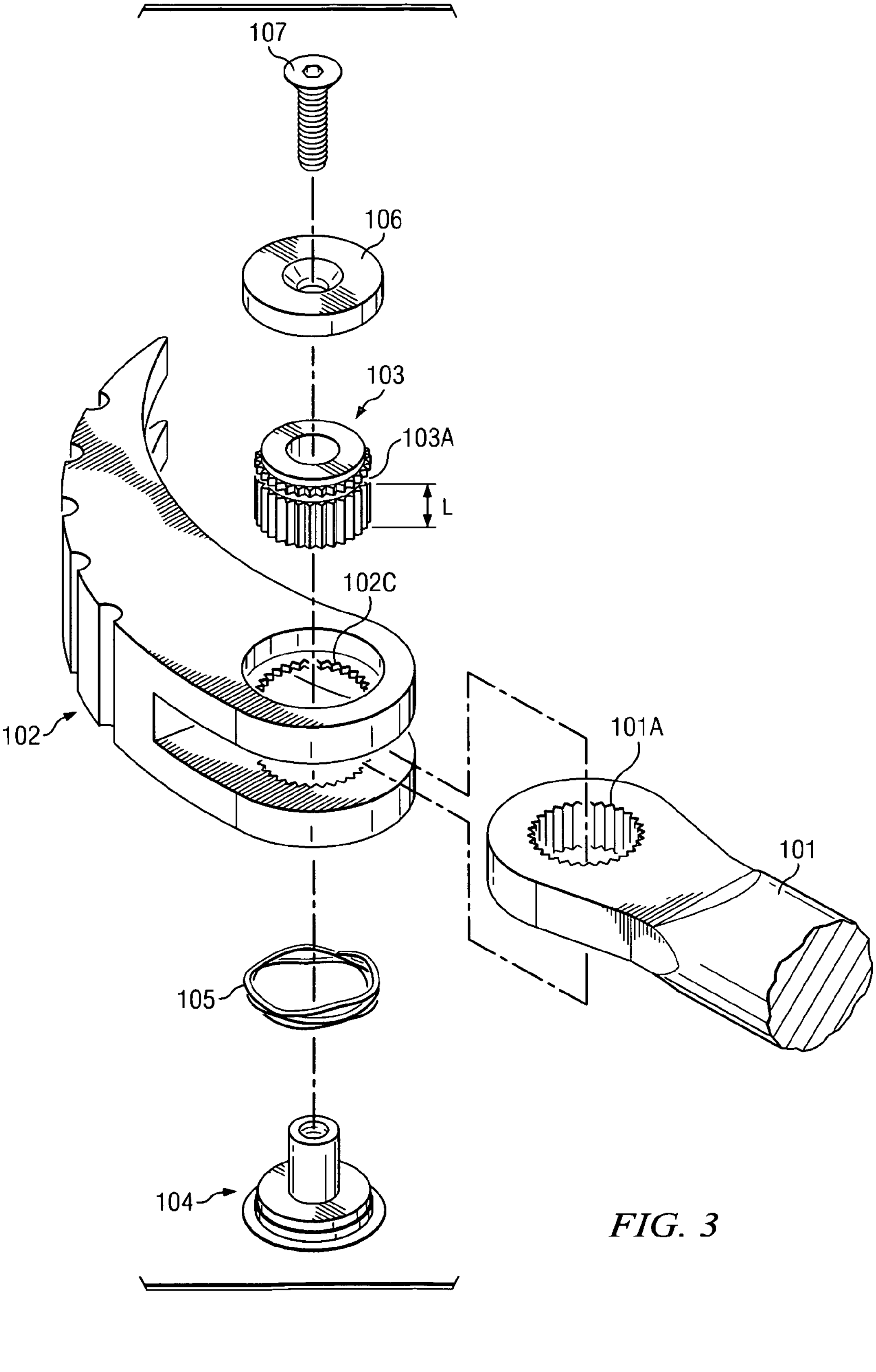
FIG. 3 is a side view of the indexable pry bar in the first embodiment of the present invention in a fully disassembled state.

FIG. 3, is a side view of the indexable pry bar in the first embodiment of the present invention in a fully disassembled state. As seen therein, first member 101 has located therethrough first splined orifice 101A which can be positioned between the upper prong and lower prong of second member 102. As seen in FIGS. 1 and 2, the first splined orifice 101A is positioned between the upper prong and the lower prong of the second member 102, with the first A coaxially aligned with the first and second splined orifices.

Figure 4:
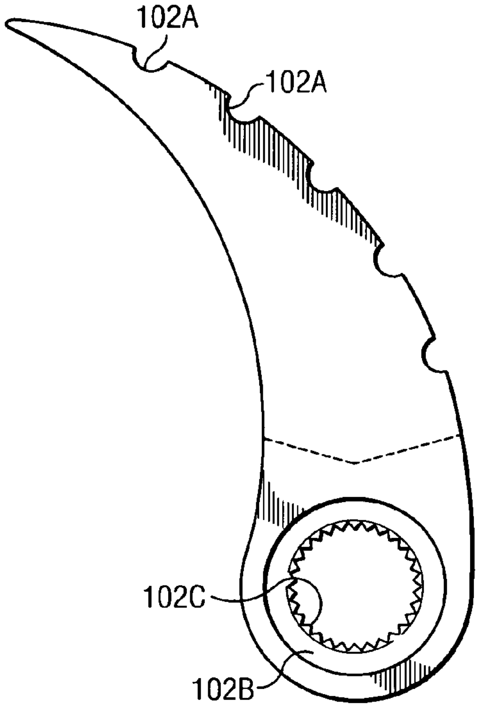
FIG. 4 is a side view of the pry bar head having the coupling assembly of the first embodiment of the present invention.

FIG. 4 is a side view of the pry bar head having the coupling assembly of the first embodiment of the present invention. As seen therein, pry bar head 102 has a plurality of notches 102A for providing a better grip between the materials being pried apart.

Figure 5A:
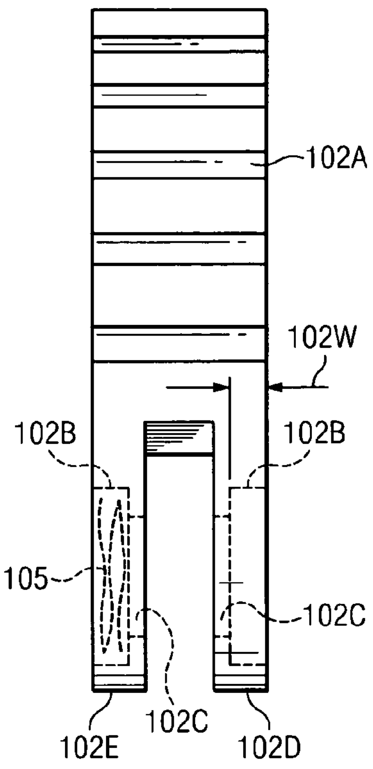
FIG. 5 is a head on view of the pry bar head having the coupling assembly of the first embodiment of the present invention.
Figure 5B:
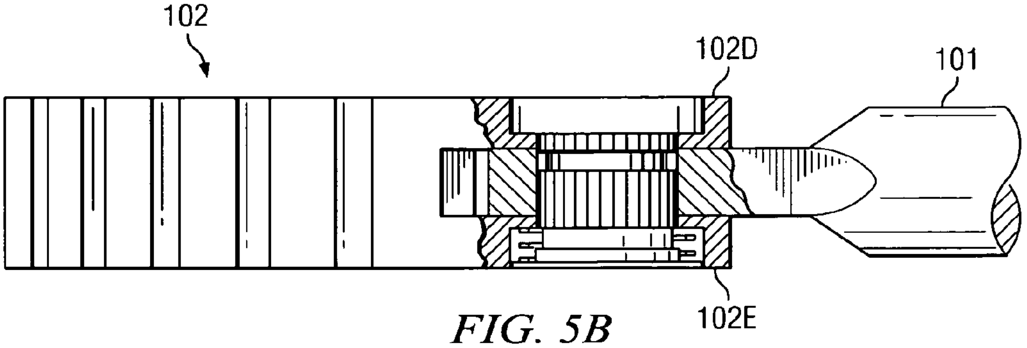

FIG. 5 is a head on view of the pry bar head having the coupling assembly of the first embodiment of the present invention. As seen therein, upper prong 102D and lower prong 102E are disposed in spaced-apart relation with a gap there between for receiving the tool handle 101 as seen in FIG. 1. The upper prong 102D and lower prong 102E include partially splined orifices that coaxially align with the splined orifice of the tool handle More specifically, the second orifice on the upper prong 102D and the third orifice on the lower prong 102E each are comprised of a smooth square cut portion 102B having a first radius circumferentially and extending a length 102W from the outer face to a depth of about halfway to ⅔ to the inner face of the respective prong and a splined portion 102C having a second radius circumferentially less than the first radius and extending from about halfway to ⅔ (as dictated by the length 102W) from the outer face to the inner face of the respective prong.

Figure 6:
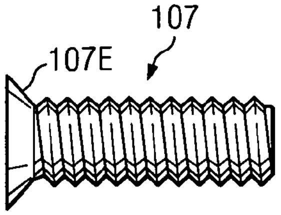
FIG. 6 is a view of a screw used in the splined pin assembly of the first embodiment of the present invention.
Figure 7:
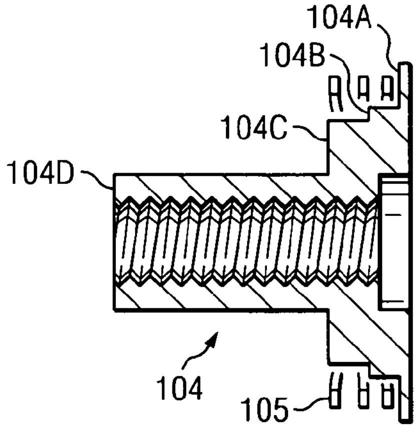
FIG. 7 is a side view of a first retaining cap used in the splined pin assembly of the first embodiment of the present invention.

FIGS. 6 to 10 illustrate the components of the splined pin assembly of the first embodiment of the present invention. FIG. 6 is a view of screw 107 used in the splined pin assembly of the first embodiment of the present invention. Screw 107 has a tapered head 107E so that when inserted through the bore of second retaining cap 106 and is coupled to first retaining cap 104, it sits flush. FIG. 7 is a side view of a first retaining cap 104 used in the splined pin assembly of the first embodiment of the present invention. As seen therein, first retaining cap 104 is a circular planar member having a first square shoulder 104A of a first radius, a second square shoulder 104B of a second, smaller radius than the first radius, and a third square shoulder 104C of a third, smaller radius than the second radius, and a centered, bored, threaded cylindrical extension 104D extending from and orthogonal to the inner face of the first retaining cap 104. Flat spring 105 is seen to have a radius such that it is seated, when the pin assembly is assembled, on the first square shoulder 104A.

Figure 8:
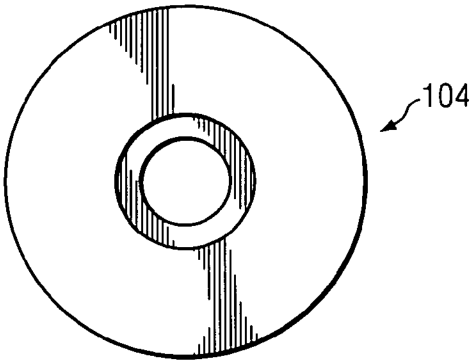
FIG. 8 is a top view of a first retaining cap used in the splined pin assembly of the first embodiment of the present invention.
Figure 9:
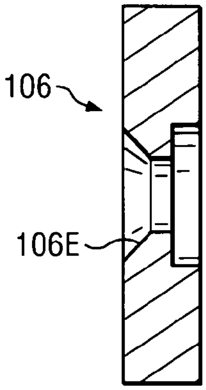
FIG. 9 is a side view of a second retaining cap screw used in the splined pin assembly of the first embodiment of the present invention.

FIG. 8 is a top view of a first retaining cap 104 used in the splined pin assembly of the first embodiment of the present invention. FIG. 9 is a side view of a second retaining cap screw 106 used in the splined pin assembly of the first embodiment of the present invention, with tapered portion 106E, the taper having an angle substantially equal to that of the taper angle 107E of screw 107.

Figure 10:
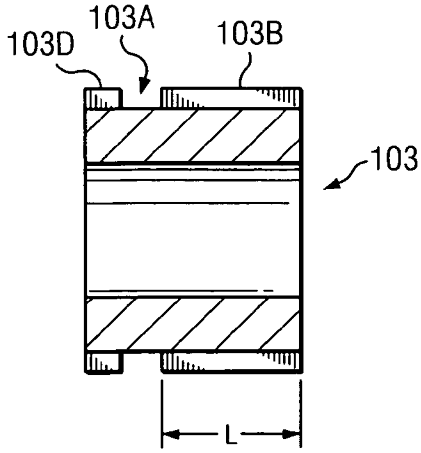
FIG. 10 is a view of a splined pin used in the splined pin assembly of the first embodiment of the present invention.

FIG. 10 is a view of a splined pin used in the splined pin assembly of the first embodiment of the present invention. As seen therein, splined pin 103 has a square channel cut 103A located a length L from the end thereof, about halfway to ⅔ from the end and is located to correspond generally with the distances of the smooth square cut portions 102B and splined portions 102C of the upper and lower prongs of member 102. The square channel cut creates a first splined portion 103B and a second splined portion 103D. The distance of channel cut 103A from the end of the splined pin 103, in association with the splined portions of the upper prong 102D and lower prong 102E of second member 102, operate to lock and unlock the first member and second member. As noted, the splined pin is disposed in the three splined orifices and is axially movable between an unlocked position and a locked position based on the position of the splined portion 103D of splined pin 103 in relation to the splined portion of either the second orifice of the upper prong 102D or the splined portion of the third orifice of the lower prong 102E of second member 102. Specifically, when the splined portion 103D of the splined pin 103 is misaligned with the splined portion 102C of the upper prong 102D or lower prong 102E, as the case may be, then the second member 102 is free to move relative to the first member 101, and hence, the tool is in the unlocked position. When the splined portion 103D of the splined pin 103 is aligned with the splined portion 102C of the upper prong 102D or lower prong 102E, as the case may be then the second member 102 is not free to move relative to the first member 101, and hence, is in the locked position. The pin assembly is adapted to move axially in the first and second orifices between the locked position and the unlocked position. The flat spring 105 as seen in FIG. 7 of the splined pin assembly is adapted to resist force after the splined pin assembly has been depressed downwardly to move the assembly into the unlocked position. The upward position is the locked position of the splined pin. Downward force is applied to the splined pin assembly to position the splined pin assembly in the unlocked, indexable position.

To assemble the present invention as seen in FIGS. 1-10, splined pin is inserted into the first member 101 with the splines aligned and snug. Flat spring 105 is placed into the smooth, channels of either the upper prong or lower prong of the second member 102, provided it is the prong that is furthest away from the square channel cut 103A of splined pin 103. The first member 101 is then inserted into the gap formed by upper prong 102D and 102E of member 102 and the splines aligned coaxially. Retaining cap 104 is then placed though the flat spring 105, the orifice in the upper prong or lower prong as the case may be of member 102 and retaining cap 106 is inserted into the smooth channel 102B of the orifice of the opposite prong of member 102. Screw 107 is then inserted though the bore of second retaining cap 106 and tightened in the threaded portion of first retaining cap 104.

Figure 11:
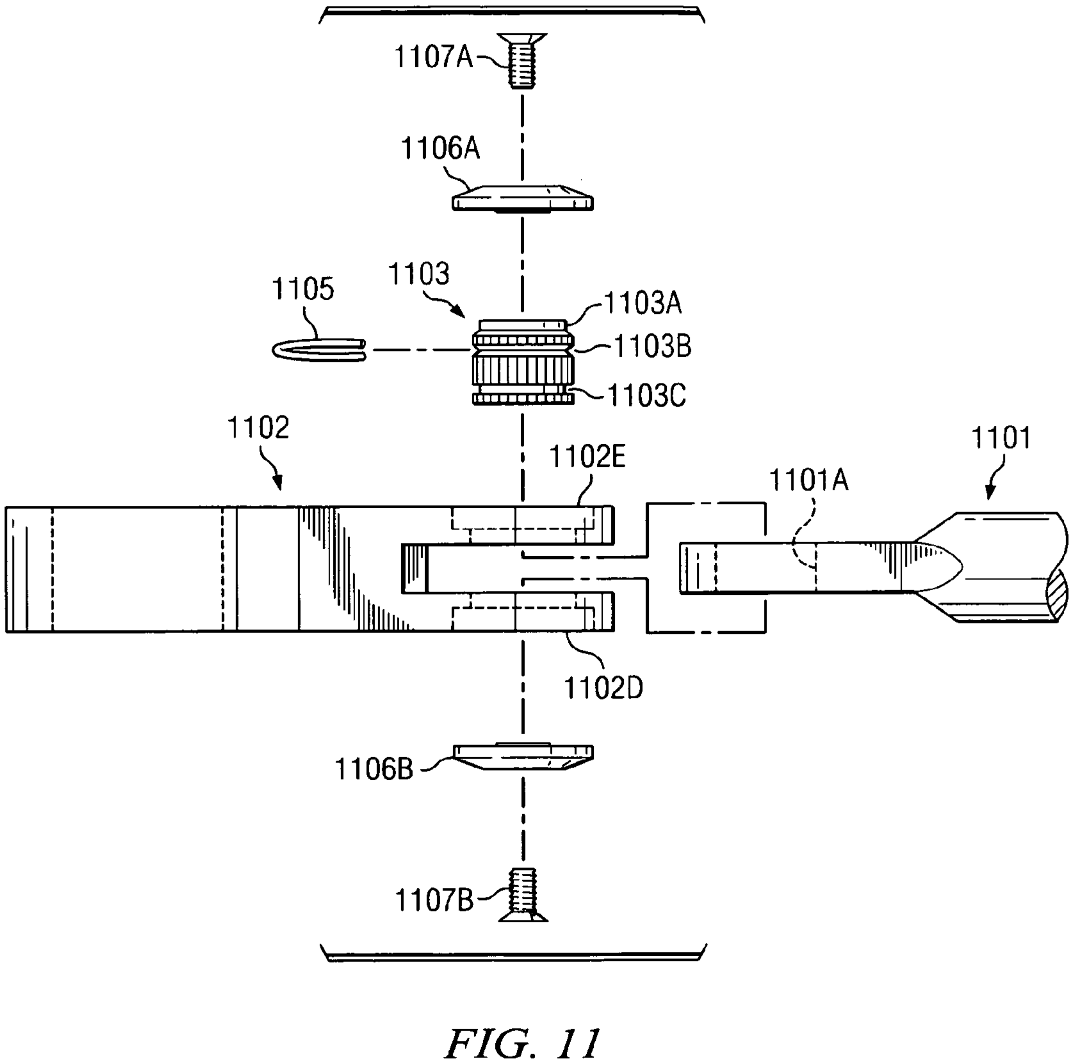
FIG. 11 is a side view of an indexable hand tool having a coupler in the second embodiment of the present invention in a fully disassembled state.

FIG. 11 is a side view of an indexable hand tool having a coupler in the second embodiment of the present invention in a fully disassembled state. As seen therein, first member 1101 is similar to first member 101 as seen in FIG. 1, except that the orifice extending through the end of the member has a splined portion of a first radius on the interior of the orifice and a smooth, circumferential portion having a slightly larger radius near the edge of such first member. Second member 1102 has a substantially similar structure as that of second member 102 as seen in FIG. 1. The splined pin assembly of the second embodiment of the present invention has a splined pin 1103 with a first, square cut 1103A around the circumference of the splined pin 1103 at the edge of the splined pin 1103, a second v-groove cut 1103B around the circumference of the pin between the longitudinal middle of the splined pin and ⅓ form the edge thereof, and a third square cut 1103C around the circumference of the splined pin near the other edge of the splined pin 1103 opposite the first square cut 1103A. Splined pin 1103 further has a threaded bore on each end thereof. The splined pin assembly further comprises a first retaining cap 1106A being a circular planar member having a centered, smooth tapered bore, a first screw 1107A adapted to be disposed through the first retaining cap 1106A to couple the first retaining cap 1106A via the first screw 1107A with one of the threaded bores of the splined pin 1103; a semi-rigid circular wire 1105 to be disposed around the splined pin 1103 near the v-groove 1103B; a second retaining cap 1106B being a circular planar member having a centered, smooth tapered,bore; and a second screw 1107B adapted to be disposed through the second retaining cap 1106B to couple the second retaining cap 1106B via the second screw 1107B with the other, opposite threaded bore of the splined pin 1103.

The circular wire 1105 of the second embodiment of the splined pin assembly is adapted to sit within the v groove channel 1103B of the splined pin 1103 in the locked position and is adapted to be forced by the a portion of the member from the v-groove onto a portion of the splined pin in the unlocked position when downward force is applied to the splined pin assembly.

In one aspect of the present invention using either the pin assembly of the first or second embodiment of the present invention, the first member comprises a tool head and the second member comprises a tool handle or handle extension. In another aspect of the present invention using either the pin assembly of the first or second embodiment, there are two splined pin assemblies, one located at the first end of a hand tool extension and the second located at the opposite end of the hand tool extensions. Alternatively, the first member and second member comprise the two ends of a hand too extension. However, as would be obvious to one skilled in the art, the first member can be interchanged with the second member and the present invention is intended to cover all such configurations. The present invention further includes the aforementioned first member and second member in combination with a variety of tool heads, such as pry bar head, ratchet head, ratcheting box wrench head, open wrench head and closed wrench head While the apparatus shown and described has been characterized as being preferred, it will be readily apparent that various changes and modifications could be made therein without departing from the scope of the invention as defined in the following claims.

I claim:

1. A hand tool coupling mechanism, comprising:

a first member having a first splined orifice;

a second member having an upper prong with a second orifice having an inner splined portion and an outer smooth cut portion around the circumference thereof and a lower prong with a third orifice having an inner splined portion and an outer smooth cut portion around the circumference thereof;

a splined pin assembly, further comprising:

a splined pin with a square cut around a circumference of the pin a predetermined length (L) from an end of the splined pin and a smooth, central longitudinal bore, the splined pin being adapted to be inserted into the first orifice;

a flat spring seated within the third orifice of the lower prong of the second member;

a first retaining cap comprising a circular planar member having a plurality of square shoulders of varying radii on an inner face thereof and a central, bored, threaded cylindrical extension extending from and orthogonal to the center of the inner face of the first retaining cap and a adapted to be inserted through the center of the first spring, the third splined orifice of the lower prong of the second member, the splined pin and the second splined orifice of the upper prong of the second member;

a second retaining cap being a circular planar member having a smooth, central, tapered bore adapted to be seated on the outer smooth cut portion of the second orifice of the upper prong and a screw with a tapered head to be disposed through the central bore of the second retaining cap to be coupled to the bored, threaded cylinder extension of the first retaining cap;

the first member being positioned between the upper prong and the prong of the second member with the first splined orifice coaxially aligned with the second and third splined orifices of the upper and lower prongs of the second member wherein the splined pin being movable from one axial position of the splined pin in which the splines on the splined pin do not mesh with the splines on the upper prong and lower prong such that pivoting of the first member with respect to the second member is permitted, to another axial position in which the splines on the splined pin mesh with the splines on the lower prong and the upper prong so that pivoting of the first member with respect to the second member is prevented.

2. The hand tool coupling mechanism of claim 1, wherein the upper prong and lower prong are disposed in spaced-apart relation with a gap there between for receiving the first member.

3. The hand tool coupling mechanism of claim 2, further comprising the second orifice on the upper prong and the third orifice on the lower prong each having a smooth square cut portion having a first radius circumferentially and extending a length from the outer face to a depth of about halfway to ⅔ to the inner face of the respective prong and a splined portion having a second radius circumferentially less than the first radius and extending from about halfway to ⅔ from the outer face to the inner face of the respective prong.

4. The hand tool coupling mechanism of claim 3, wherein the flat spring is seated, when the pin assembled, on one of the plurality of square shoulders on the inner face of the first retaining cap.

5. The hand tool coupling mechanism of claim 4, wherein the square channel cut of the splined pin is located about halfway to ⅔ from the end the splined pin being inserted through the first, second and third orifices;

the square channel cut separating being a first portion and a second splined portion of the splined pin, the first splined portion having a width (W) wider than second splined portion; and the position of the square channel cut, in relation to the splined portions of the upper prong and lower prong of second member being changed when the first retaining cap is depressed, thereby compressing the flat spring, and aligning the square cut channel cut with the splined portion of the prong such that the splined pin is movable from one axial position in which the splines on the splined pin do not mesh with the splines on the upper prong and lower prong and pivoting of the first member with respect to the second member is permitted, to another axial position in which the splines on the splined pin mesh with the splines on the lower prong and the upper prong so that pivoting of the first member with respect to the second member is prevented.

6. The hand tool coupling mechanism of claim 5 wherein the splined pin is disposed in the three splined orifices and is axially movable between an unlocked position and a locked position based on the position of the splined portions of the splined pin.

7. The hand tool coupling mechanism of claim 6, wherein when the splined portions of the splined pin are misaligned with are splined portion of the upper prong and lower prong then the second member is free to move relative to the first member, and hence, the hand tool coupling mechanism is in the unlocked position; and when the splined portions of the splined pin are aligned with the splined portion of the upper prong and lower prong then the second member is not free to move relative to the first member, and hence, the hand tool coupling mechanism is in the locked position.

8. The hand tool coupling mechanism of claim 7 wherein the flat spring of the splined pin assembly is adapted to resist force after the first retaining cap of the splined pin assembly has been depressed to move the assembly into the unlocked position.

9. The hand tool coupling mechanism of claim 1, wherein the flat spring of the splined pin assembly is adapted to resist force after the first retaining cap of the splined pin assembly has been depressed to move the pin assembly into an unlocked position.

10. The hand tool coupling mechanism of claim 9, wherein the first member is a tool handle and the second member is a tool head.

11. The hand tool coupling mechanism of claim 9, wherein the first member is one selected from the group consisting of a pry bar, open wrench, closed wrench, ratchet, and ratcheting box wrench.

12. The hand tool coupling mechanism of claim 9, wherein the first member is a pry bar having a plurality of notches across a planar portion thereof adapted to allow an improved grip between two materials.

* * * * *